United States Patent

[11] 3,574,256

| [72] | Inventor | Raymond Burt Chase<br>Midland, Mich. |
|---|---|---|
| [21] | Appl. No. | 732,361 |
| [22] | Filed | May 27, 1968 |
| [45] | Patented | Apr. 13, 1971 |
| [73] | Assignee | The Dow Chemical Company<br>Midland, Mich. |

[54] METHOD OF REPAIRING A GLASS-COATED SURFACE
2 Claims, 5 Drawing Figs.

[52] U.S. Cl. .................................................. 29/401,
29/530, 220/63
[51] Int. Cl. ................................................. B23p 17/00
[50] Field of Search........................................... 29/401,
530; 220/63, 64, 80

[56]  References Cited
UNITED STATES PATENTS

| 2,712,326 | 7/1955 | Yurdin .................. | (29/401UX) |
| 3,365,097 | 1/1968 | Chase..................... | 220/63 |
| 3,419,448 | 12/1968 | Dickinson ............. | 29/401X |

*Primary Examiner*—John F. Campbell
*Assistant Examiner*—D. C. Reiley
*Attorneys*—Griswold and Burdick and Albin R. Lindstrom

ABSTRACT: A hollow, terminating structure coated with glass to resist corrosion, when chipped, is patched with a conforming sheath of corrosion resistant metal secured through opposed projecting flanges and filled with resin cured in situ.

PATENTED APR 13 1971

3,574,256

INVENTOR.
Raymond B. Chase
BY Thomas J. Page
AGENT

METHOD OF REPAIRING A GLASS-COATED SURFACE

BACKGROUND OF THE INVENTION

The glass coating of equipment kind to corrosion, notably production equipment used in the food and chemical industries and the like, is well known. Among the structures thus protected from corrosion are structures such as the thermal well, the baffle, of which the supported structure is often used as a thermal well, and the agitator. Routinely, a thermal well must be hollow to accept a temperature sensing device of some kind and, routinely, it is filled at least partially full of some substance as heat transfer medium that is liquid at operating temperatures and does not boil in the operating temperature range. Oils are representative heat transfer materials as are certain glycol derivatives and the like. Baffles that are positioned within chemical reaction vessels to break circumferential vortices and achieve differential mixing of the vessel contents rather than circumferential transport, are usually also hollow. Agitator blades and shafts are commonly hollow and the shafts are commonly produced beyond their intersection with the lateral blades that do the actual mixing.

In handling, installation, occasionally from operational stresses and thermal shock, and in other ways, these structures may suffer surface break of the glass coating. Breakage sometimes occurs, especially at rounded ends, purely from internal stresses in the glass or ceramic coating. Such breaks are points at which unprotected metal formerly covered by glass is then exposed to corrosion. At the least this exposure results in a decline of the purity and quality of product being made and oftentimes constitutes a safety hazard.

The safety hazard can be understood when it is recognized that the interior space of glass lined reaction vessels is often under pressure, as a condition necessary to efficient chemical synthesis reaction; is often operated at an elevated temperature; almost always contains reactive chemical substances. Conditions such as these can be maintained with safety only as the confinement of vessel contents is assured. A glass coating break, as a locus of corrosion, can readily become a leak. As a leak it can permit intolerable egress of reactive vessel contents possibly under pressure, and can permit intolerable mixing of heat transfer medium with vessel contents. So real is this safety hazard that, in some operations, during intervals of temporary disuse, agitators, baffles, thermal wells and the like are routinely inspected for surface glass breaks and immediately taken out of service if damaged. Such inspection is usually visual, tactile, and by means of electric spark.

Articles of which the glass coating had broken can be sent to the manufacturer for reglassing. However, reglassing takes time and is expensive. Replacement parts are expensive and delivery is often slow. It is desired to be able to make prompt repair that will be relatively permanent, will not increase safety hazards and that will maintain product quality.

DESCRIPTION OF THE PRIOR ART

Prior to the present invention the routine method of patching such breaks has been to through the wall of the structure exhibiting a chipped glass surface and to tap it, threading in a stud, and, by a nut on the stud to secure a relatively conforming centrally drilled surface patch of metal. Metal parts have usually been of nickel, stainless steel, or tantalum, and such patches have usually been gasketed with some relatively resilient usually plastic material resistant to the chemical influences to which it is exposed. The site is prepared by grinding, the hole is drilled and tapped the stud inserted and the patch secured by tightening the nut. One embodiment of such patch appears in U.S. Pat. No. 3,236,407.

In principle such repair might be expected to be successful; in practice it has not consistently been for the reason that, even when the gasket material is augmented by the employment of a curable resin filler, leakage sometimes occurs, and when it does, corrosion around the threaded hole drilled through the wall of the structure conduces to leakage of chemical contents of the vessel in which the structure is positioned. As glass lined equipment is used only where corrosion is a problem of at least fair severity, incipient corrosion at sites of unprotected metal, as where a hole has been drilled and tapped, quickly worsens. The problem is often aggravated by the fact that vessel contents impinging upon the patch are frequently under pressure which, depending upon the chemical substances and the reactions to which they are exposed may be very high pressure. When leakage has begun, almost invariably hydrogen ion activity or the like, manifested on the unglazed and essentially unprotected interior surfaces of the hollow structure (such as the interior of a thermal well) builds up a pressure between the remaining glass lining and the metal of which the structure is made with the result that the glass lining spalls off and the damage becomes worse.

Leakage of this kind is inadmissible in the chemical industry. Liberated hydrogen is a fire and explosion hazard in air. Flammable, corrosive, or other potentially dangerous substances may be involved and, if permitted to leak, may cause damage to other equipment such as the motors and gear trains driving agitators; or may permit leakage of heat transfer fluids with the result that spurious temperature readings are given. When a spurious temperature reading is supplied to the automated equipment now in widespread use in the chemical industry, the false temperature reading may call for aggravated supply of some highly reactive substance to be added, and can thus give rise to safety hazards of great severity.

It is imperative that, whatever method be undertaken of protecting a glass-coated hollow structure within a chemical reactor vessel, it not permit worsening of a problem of chemical leakage.

DESCRIPTION OF THE INVENTION

For use in most loci where glass-coated equipment is required it is contemplated that the patch of the present invention will be made of sheet tantalum, of any desired thickness. The structure has been formed and used successfully from sheet tantalum and put into test application repeatedly. Tantalum is notorious for the difficulty of working it. It is so refractory as not to admit of casting from a melt. The sheet metal cannot be annealed and it work hardens very quickly when flexed, pounded, formed, or otherwise manipulated. Prior to work hardening, it galls and tears very readily and as work hardening sets in it becomes readily susceptible to the forming of hairline cracks as well. For these reasons, not all shapes can be fabricated of tantalum whereas the present shape can be. For those applications in which other metal such as stainless steel, nickel, platinum, and the like can be used without introduction or inadmissibly severe corrosion problems, metal other than tantalum can be used: no other metal employed in this way presents the difficulty of working that pertains to tantalum. "Nickel" is inclusive of nickel alloys having a substantial content of nickel and a content also of such other metals as iron, copper, and the like with the properties of the nickel predominating.

BRIEF DESCRIPTION OF THE DRAWING

Turning now to the drawing.

The most common loci of glass surface breaks are, on experience, areas of, or near to, the spherically to subspherically rounded end of the thermal well terminus 5 or of the baffle arm 10. Possibly internal stresses of the glass coating of these places account for some of the breakage. At times, incautious handling in installation or removal causes a break. Causes of surface glass breakage are not always known.

Figure 1:
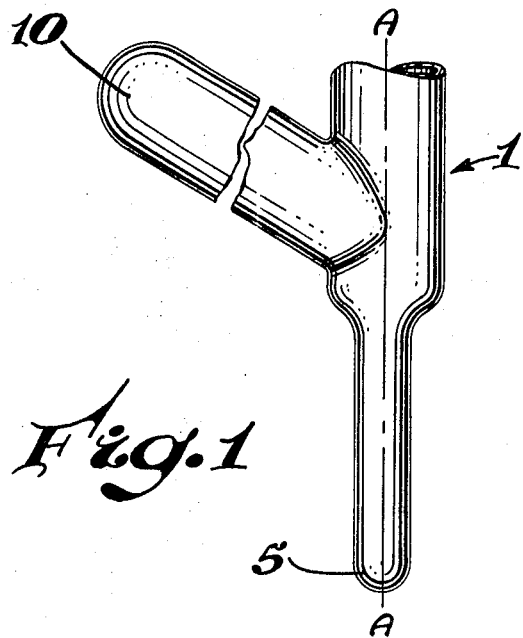
FIG. 1 shows the end, 5, of a glass-coated baffle, 1, that end inwardmost with respects to a glass lined chemical reaction vessel. Axis A—A of the baffle is positioned to be generally parallel to a stirring shaft, and thus parallel also to the vortex of reacting liquid substances which the baffle arm 10 is to deflect. The structure is usually of ferrous metal beneath the glass coating, and is hollow; a temperature sensing device (not shown) is commonly positioned inside end 5 and communicates by electrically conducting wires (not shown) with recording instruments and automatic controls.
Figure 2:
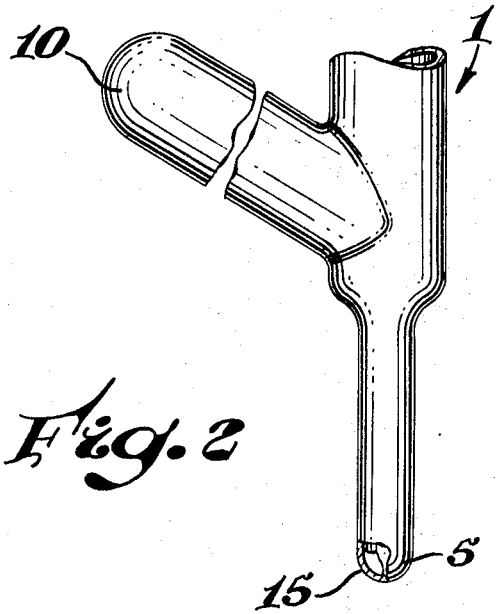

Such a break, 15, is shown in FIG. 2 at the rounding thermal well end 5 of baffle 1. However, it is to be understood that this is illustrative and representative only, and that like breaks in other terminating glass-coated structures are similarly repaired according to this invention. A break at any locus upon or near an axial terminus of such structure is reparable by this invention.

The sheath patch of this invention is fabricated in various ways which are apparent from the present drawing and specification. Projecting flanges 25 and 30 are satisfactorily formed separate from and attached to the body of collar 26; by refolding, as shown. Either or both of flanges 25 and 30 can be made separately and attached as by spot welding, preferably at a place or places approximately diametrically opposite flanges 25 and 30.

In whatever manner of construction, end endpiece is formed as the necessary cup-shaped structure in any convenient manner such as by positioning over a pattern or, successively, several patterns, convex or concave, and forming as by stamping, spinning, pressing, or, usually, peening. Endpiece 24 can be made separate from the main body of the repair sheath separately shaped, and attached as by spot welding. Instead of being formed as an intact disc, it can be formed with alternate sectors removed, the remaining sectors being attached to one another centrally, and the bottom of the patch formed by bringing the attached sectors together to be secured together by their edges as by welding. The end 24 of the sheath patch of this invention should conform closely to end 5 which it is to patch.

Figure 4:
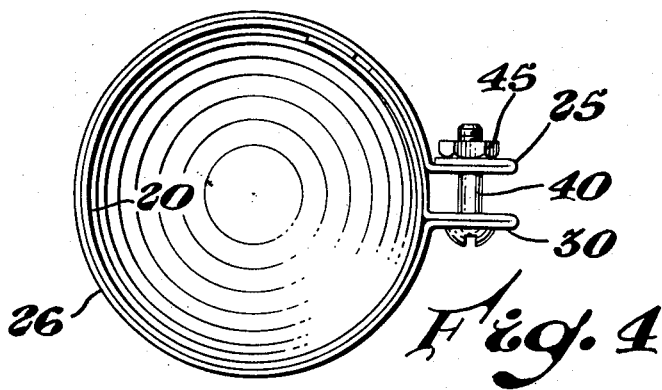
Figure 5:
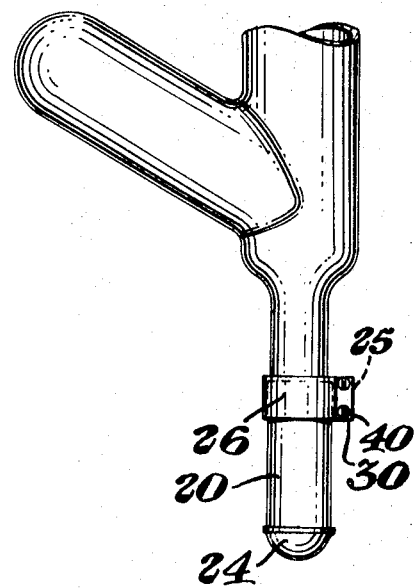
Figure 3:
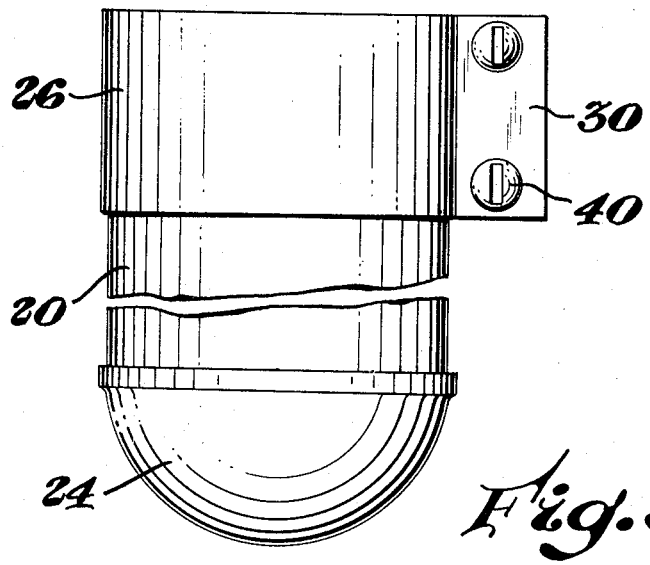

The finished patch sheath takes the general form shown in FIGS. 3 and 4. Welded seams are to be fluidtight and are to be tested, as by carefully filling the finished patch with acetone to substantially the depth to which its walls are intact, and inspecting for leakage. Acetone discloses leaks better than water.

To use the instant sheath patch, one fabricates it to conform to a desired degree of approximation to the original surface it is to repair. One then machines, grinds, or otherwise finishes the chipped vitreous surface 15 to remove loose or partially loosened chips, to obviate elaborate surface features, and to leave a relatively smooth patchable area characterized by relatively uniform, relatively small, surface features such as the "tooth" left from abrasive grinding. Such features assist in securing resin filler to obtain a good patch: but are not critically necessary.

In preparing the chipped or broken area, as by grinding, care should be exercised not to remove more material than is necessary, and in particular to avoid weakening the metal structure beneath the glass coating.

The prepared site is then filled with a filler resin. It should be a resin that is formably plastic but not quickly flowable as applied, desirably of good adhesive properties; curable as with heat, to obtain an insoluble, infusible, chemically substantially inert, hard, durable substance. The epoxy resins are excellent in this application; but polyesters, phenol-formaldehyde, resorcinol-formaldehyde, and like resins are also used.

Resin is to be applied, and tooled or otherwise formed, to conform approximately to the undamaged glass surface. A slight excess can be employed. This first resin is cured, and is then machined to reproduce the original surface conformation as closely as is practical. Thereafter, a thin coating of further resin, the same or different, is applied over the intact glass surface that the sheath patch of this invention is to cover, to form a seal. The resin is applied also over the interior surface of the sheath patch, and, usually with a rotary axial motion, the sheath is slipped securely into place, expelling air as far as possible.

Collar 26 is passed around the upper end of the main body 20 of the patch and the glass surface over which the patch is to be installed, and is flexed to follow or closely approximately follow the curvature of the underlying glass surface.

In this condition, projecting flanges 25 and 30 approximate and their holes align. A stud, 40, bolt, rivet or the like is passed through both, and secured by a nut or nuts, 45, by upsetting, or the like, bringing said flanges towards one another snugly, to cause a strong frictional attachment, by the collar 26 of the sheath to the structure being repaired. The fastener means here shown as a bolt, 40, and nut, 45, are of the same metal as the sheath patch which they secure, to avoid setting up an electrolytic couple.

At this juncture, the resin is caused to cure, as by the application of heat, and the repair is complete.

I claim:

1. Method of repairing a surface break in a glass surface of a terminating glass-coated structure which comprises the steps of machining the break to obviate major surface irregularities, filling the machined surface with curable resin to near its original surface form, and applying a cementitious curable resin to at least the interior of a sheath repair patch of corrosion resistant metal having one closed end and an opposing open end, said open end being provided with opposing projecting tightenable flanges, said closed end conforming approximately to an end of said terminating structure the chipped glass coating of which it is to repair, positioning said sheath patch conformingly over the end of the terminating structure it is to repair, and frictionally securing said open end by approximating projecting flanges, and curing said cementitious resin.

2. Method of claim 1 in which said sheath repair patch is applied to a surface substantially entirely coated with a curable resin to the extent of said patch.